US009683127B2

(12) United States Patent
Steinbrecher et al.

(10) Patent No.: US 9,683,127 B2
(45) Date of Patent: Jun. 20, 2017

(54) WATER-EMULSIBLE ISOCYANATES HAVING IMPROVED GLOSS

(71) Applicant: BASF SE, Ludwigshafen (DE)

(72) Inventors: Angelika Maria Steinbrecher, Cluj-Napoca (RO); Peter Keller, Spiesen-Elversberg (DE); Frederic Lucas, Offenburg (DE)

(73) Assignee: BASF SE, Ludwigshafen (DE)

( * ) Notice: Subject to any disclaimer, the term of this patent is extended or adjusted under 35 U.S.C. 154(b) by 38 days.

(21) Appl. No.: 14/430,661

(22) PCT Filed: Sep. 16, 2013

(86) PCT No.: PCT/EP2013/069082
§ 371 (c)(1),
(2) Date: Mar. 24, 2015

(87) PCT Pub. No.: WO2014/048776
PCT Pub. Date: Apr. 3, 2014

(65) Prior Publication Data
US 2015/0225605 A1 Aug. 13, 2015

Related U.S. Application Data

(60) Provisional application No. 61/706,806, filed on Sep. 28, 2012.

(30) Foreign Application Priority Data

Sep. 28, 2012 (EP) .................................... 12186603

(51) Int. Cl.
| C09D 175/08 | (2006.01) |
|---|---|
| C08G 18/66 | (2006.01) |
| C08G 18/42 | (2006.01) |
| C08G 18/32 | (2006.01) |
| C08G 18/48 | (2006.01) |
| C09D 175/06 | (2006.01) |
| C08G 18/12 | (2006.01) |
| C08G 18/28 | (2006.01) |
| C08G 18/79 | (2006.01) |
| C08G 18/24 | (2006.01) |
| C08G 18/36 | (2006.01) |
| C08G 18/22 | (2006.01) |
| C08G 18/70 | (2006.01) |
| C09J 175/08 | (2006.01) |

(52) U.S. Cl.
CPC ........... *C09D 175/08* (2013.01); *C08G 18/12* (2013.01); *C08G 18/222* (2013.01); *C08G 18/246* (2013.01); *C08G 18/283* (2013.01); *C08G 18/3221* (2013.01); *C08G 18/36* (2013.01); *C08G 18/4269* (2013.01); *C08G 18/4277* (2013.01); *C08G 18/4804* (2013.01); *C08G 18/4833* (2013.01); *C08G 18/664* (2013.01); *C08G 18/6644* (2013.01); *C08G 18/6674* (2013.01); *C08G 18/6677* (2013.01); *C08G 18/706* (2013.01); *C08G 18/792* (2013.01); *C09D 175/06* (2013.01); *C09J 175/08* (2013.01)

(58) Field of Classification Search
CPC .............. C08G 18/283; C08G 18/3221; C08G 18/4833; C08G 18/792; C08G 18/36; C08G 18/4804; C08G 18/4277; C08G 18/12; C08G 18/6644; C08G 18/4269; C08G 18/664; C08G 18/6674; C08G 18/6677

See application file for complete search history.

(56) References Cited

U.S. PATENT DOCUMENTS

| 3,479,310 | A | 11/1969 | Dieterich et al. |
|---|---|---|---|
| 3,769,318 | A | 10/1973 | Windemuth et al. |
| 4,092,286 | A | 5/1978 | Noll et al. |
| 4,108,814 | A | 8/1978 | Reiff et al. |
| 4,190,566 | A | 2/1980 | Noll et al. |
| 4,596,678 | A | 6/1986 | Merger et al. |
| 4,596,679 | A | 6/1986 | Hellbach et al. |
| 4,647,647 | A | 3/1987 | Haubennestel et al. |
| 4,762,752 | A | 8/1988 | Haubennestel et al. |
| 5,087,739 | A | 2/1992 | Bohmholdt et al. |
| 6,777,523 | B1 * | 8/2004 | Laas ................. C08G 18/6254 252/182.22 |
| 2004/0019160 | A1 * | 1/2004 | Dai .................... C08G 18/0823 525/457 |
| 2005/0239989 | A1 * | 10/2005 | Haberle ............... C08G 18/283 528/44 |
| 2010/0105833 | A1 * | 4/2010 | Keller ................. C08G 18/092 524/839 |
| 2010/0183883 | A1 * | 7/2010 | Schaefer ............ C08G 18/0828 428/423.1 |

(Continued)

FOREIGN PATENT DOCUMENTS

| DE | 26 51 505 A1 | 5/1978 |
|---|---|---|
| DE | 27 32 131 A1 | 1/1979 |
| DE | 28 11 148 A1 | 9/1979 |

(Continued)

OTHER PUBLICATIONS

U.S. Appl. No. 14/428,719, filed Mar. 17, 2015, Lucas, et al.
International Search Report and Written Opinion issued Mar. 25, 2014 in PCT/EP2013/069082 (with English language translation).

*Primary Examiner* — Rabon Sergent

(74) *Attorney, Agent, or Firm* — Oblon, McClelland, Maier & Neustadt, L.L.P.

(57) ABSTRACT

The invention relates to a process for the preparation of water-emulsifiable isocyanates and to their use.

10 Claims, No Drawings

(56) References Cited

U.S. PATENT DOCUMENTS

2012/0016074 A1* 1/2012 Elizalde .............. C08G 18/3206
                                                         524/590

FOREIGN PATENT DOCUMENTS

| | | |
|---|---|---|
| DE | 40 01 783 A1 | 7/1991 |
| DE | 41 13 160 A1 | 10/1992 |
| DE | 197 24 199 A1 | 12/1998 |
| DE | 198 22 890 A1 | 11/1999 |
| DE | 198 47 077 A1 | 11/1999 |
| DE | 199 58 170 A1 | 6/2001 |
| DE | 100 07 820 A1 | 8/2001 |
| DE | 100 13 186 A1 | 9/2001 |
| DE | 100 13 187 A1 | 10/2001 |
| DE | 101 61 156 A1 | 6/2003 |
| EP | 0 000 194 A1 | 1/1979 |
| EP | 0 126 299 A1 | 11/1984 |
| EP | 0 126 300 A1 | 11/1984 |
| EP | 0 206 059 A2 | 12/1986 |
| EP | 0 355 443 A2 | 2/1990 |
| EP | 0 486 881 A2 | 5/1992 |
| EP | 0 531 820 A1 | 3/1993 |
| EP | 0 540 985 A1 | 5/1993 |
| EP | 0 582 166 A1 | 2/1994 |
| EP | 0 649 866 A1 | 4/1995 |
| EP | 0 697 424 A1 | 2/1996 |
| EP | 0 703 255 A1 | 3/1996 |
| EP | 0 728 785 A1 | 8/1996 |
| EP | 0 754 713 A2 | 1/1997 |
| EP | 0 959 087 A1 | 11/1999 |
| EP | 2 368 926 A1 | 9/2011 |
| GB | 994890 A | 6/1965 |
| GB | 1076688 A | 7/1967 |
| WO | WO 2004/022624 A1 | 3/2004 |
| WO | WO 2011/124710 A1 | 10/2011 |
| WO | WO 2012/007431 A1 | 1/2012 |
| WO | WO 2014/048634 A2 | 4/2014 |

* cited by examiner

WATER-EMULSIBLE ISOCYANATES HAVING IMPROVED GLOSS

The invention relates to a process for the preparation of water-emulsifiable isocyanates, and to their use.

Water-emulsifiable polyisocyanates are added as crosslinking agents to aqueous polymer dispersions and have been widely described in the literature. Emulsifiability in water is brought about by blending the polyisocyanates with emulsifiers which are obtained by reacting the polyisocyanates with hydrophilic molecules.

Hydrophilic molecules commonly used include nonionic hydrophilic molecules such as polyalkylene oxide alcohols.

EP-A2 206 059 describes water-dispersible polyisocyanate formulations comprising an aliphatic polyisocyanate and a reaction product of an aliphatic polyisocyanate with a monohydric or polyhydric, nonionic polyalkylene ether alcohol emulsifier which has at least one polyether chain containing at least 10 ethylene oxide units. As suitable polyisocyanates, extensive lists are given of aliphatic and cycloaliphatic diisocyanates, more preferably isocyanurates and biurets based on 1,6-diisocyanatohexane (HDI) and/or isocyanurates based on 1-isocyanato-3,5,5-trimethyl-5-isocyanatomethylcyclohexane (IPDI).

EP-A1 540 985 likewise describes polyisocyanate mixtures, but in this case the polyether chains have an average ethylene oxide unit content of from 5.0 to 9.9.

EP-A2 486 881 describes nonaqueous aliphatic polyisocyanate formulations comprising polyisocyanates from a list of aliphatic polyisocyanates and comprising an amount, sufficient to ensure the dispersibility of the aliphatic polyisocyanate, of a reaction product of an aromatic or aliphatic diisocyanate and a monohydric or (less preferably) polyhydric polyalkylene ether alcohol having at least 8 ethylene oxide units in the polyether chain. The examples use exclusively monofunctional polyethylene glycols. Reaction of the diisocyanates with the alcohols takes place in a ratio of 60 to 120 mol % in terms of OH groups, relative to the NCO groups of the diisocyanate. The products thus obtained then act as emulsifiers in the blends with polyisocyanates.

EP 959087 A1 describes water-emulsifiable, polyether-modified polyisocyanate mixtures in which a high proportion of the polyethers is bonded to the polyisocyanate via allophanate groups.

A disadvantage of this is that the reaction to form allophanate groups consumes two equivalents of isocyanate groups per hydroxyl group, thus sharply lowering the NCO content of the product as measured on the basis of the reactant.

DE-A1 199 58 170 describes polyether-modified, water-dispersible polyisocyanate mixtures which have been modified with monohydric polyalkylene oxide polyether alcohols. Very particular preference is given to polyisocyanates or polyisocyanate mixtures with an isocyanurate structure based on HDI, IPDI and/or 4,4'-diisocyanatodicyclohexylmethane.

DE-A1 198 22 890 describes aqueous two-component polyurethane coating systems whose hardener component is prepared from polyalkylene oxide polyether alcohols and aliphatically and/or cycloaliphatically attached isocyanate groups, preferably isocyanurate structures based on HDI, IPDI and/or 4,4'-diisocyanatodicyclohexylmethane, under allophanatization conditions. The predominant attachment of polyether chains by way of allophanate groups is also known from DE-A1 198 47 077.

Nonionic emulsifiers described include polyvinylpyrrolidone-modified polyisocyanates (EP-A2 754 713).

Also in use as actively dispersing units are polyalkylene oxide ethers comprising carboxylic acid groups, as described in DE-A1 100 07 820 and DE-A1 41 13 160, or polyether ester alcohols (EP-A1 728 785).

DE-A1 40 01 783 describes polyisocyanate mixtures which, with a uretdione content of 1% to 23% by weight, comprise chemically bonded carboxyl groups for dispersibility.

Furthermore, carboxyl-comprising compounds are described as emulsifiers (EP-A2 548 669), tertiary amino and/or ammonium groups (EP-A1 582 166 and EP-A1 531 820), acidic esters of phosphoric acid (DE-A1 197 24 199) or sulfonic acids (EP-A1 703 255).

A disadvantage of the polyisocyanate mixtures described is that they do not meet the requirements imposed on the gloss of the coatings obtainable using them.

Water-emulsifiable isocyanates can be dissolved in organic solvents such as, for example, carbonic esters or lactones for the purpose of improving dispersibility, as described in EP-A 697 424.

WO 2004/22624 describes water-emulsifiable mixtures of polyisocyanates based on hexamethylene 1,6-diisocyanate with polyisocyanates based on isophorone diisocyanate, which exhibit not only high hardness but also good water-emulsifiability.

However, the drying properties of the coatings obtained with these coating materials are inadequate.

WO 2012/007431 describes high-functionality polyisocyanates which contain urethane groups and are obtainable by reacting at least one polyfunctional alcohol with at least one polyisocyanate in a molar ratio of NCO groups to OH groups of at least 3:1.

A disadvantage is that these high-functionality polyisocyanates with urethane groups are not water-emulsifiable.

WO 2011/124710 A1 describes coating compositions comprising hydroxy-containing fatty acid glycerides, polyisocyanates, and binders.

The resultant coatings exhibit self-healing effects on heating.

A disadvantage is that the coating compositions, which constitute a three-component system, are not water-emulsifiable.

Users require water-emulsifiable isocyanate to have the following properties:

1. The isocyanate should be easy to emulsify; having to use demanding apparatus such as high-shear stirring elements is deprecated.
2. The emulsion should be fine, since otherwise the gloss may be disrupted or haze may appear, for example.
3. In the case of coatings, a desire is for a high gloss.
4. Water-emulsifiable isocyanate is not to have too high a viscosity.

It was an object of the present invention to provide a process for preparing water-emulsifiable polyisocyanates that have good emulsifiability properties, have a viscosity at 23° C. of not more than 12 Pas, and produce coatings featuring high gloss.

The object has been achieved by means of water-emulsifiable polyisocyanates comprising
(A) at least one polyisocyanate based on at least one (cyclo)aliphatic diisocyanate,
(B) at least one polyol having
a functionality of hydroxyl groups of at least 2 and up to 4 and
a number-average molar weight of at least 92 to 1500 g/mol, (C) at least one monoalcohol containing ethylene oxide groups, which has at least 7 ethylene oxide groups, and (D) optionally solvent, where the ratio of NCO groups in (A) to hydroxyl groups in (B) and (C) is from at least 5:1 to 100:1, the amount of ethylene oxide groups, calculated as 44 g/mol, based on the sum total of (A), (B) and (C), is at least 12% by weight, preferably at least 14%, more preferably at least 15% by weight, the amount of component (B) is from 0.5 to 4.0% by weight, the amount of component (C) is at least 5% and up to 25% by weight, and the viscosity at 23° C. in accordance with DIN EN ISO 3219/A.3 in a cone/plate system with a shear rate of 1000 s$^{-1}$ is from 2500 mPas to 12 000 mPas.

The mixtures exhibit easy emulsifiability, lead to a stable and fine emulsion, and the coatings obtainable with them exhibit high gloss.

The polyisocyanates (A) are oligomers of aliphatic or cycloaliphatic diisocyanates, identified for short in this specification as (cyclo)aliphatic.

The NCO functionality of such a compound is generally at least 1.8 and can be up to 8, preferably 1.8 to 5, and more preferably 2 to 4.

Polyisocyanates contemplated are polyisocyanates having isocyanurate groups, polyisocyanates having uretdione groups, polyisocyanates having biuret groups, polyisocyanates having urethane groups or allophanate groups, polyisocyanates comprising oxadiazinetrione groups or iminooxadiazine dione groups, uretonimine-modified polyisocyanates of linear or branched $C_4$-$C_{20}$ alkylene diisocyanates, and cycloaliphatic diisocyanates having a total of 6 to 20 C atoms, or mixtures thereof.

The diisocyanates are preferably isocyanates having 4 to 20 C atoms. Examples of typical diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di-(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane, or 2,4- or 2,6-diiso-cyanato-1-methylcyclohexane, and also 3 (or 4), 8 (or 9)-bis (isocyanatomethyl)tricyclo-[5.2.1.0$^{2.6}$]decane isomer mixtures.

Mixtures of said diisocyanates may also be present.

The diisocyanates which can be used preferably have an isocyanate group content (calculated as NCO, molecular weight=42) of 10% to 60% by weight, based on the diisocyanates (mixture), preferably 15 to 60% by weight, and more preferably 20% to 55% by weight.

Preference is given to aliphatic and/or cycloaliphatic— referred to collectively for the purposes of this specification as (cyclo)aliphatic—diisocyanates and polyisocyanates, examples being the abovementioned aliphatic and/or cycloaliphatic diisocyanates, or mixtures thereof.

Particular preference is given to hexamethylene diisocyanate, 1,3-bis(isocyanatomethyl)-cyclohexane, isophorone diisocyanate, and 4,4'- or 2,4'-di(isocyanatocyclohexyl) methane, very particular preference to isophorone diisocyanate and hexamethylene diisocyanate, and especial preference to hexamethylene diisocyanate.

Isophorone diisocyanate is usually in the form of a mixture, specifically a mixture of the cis and trans isomers, generally in a ratio of about 60:40 to 80:20 (w/w), preferably in a ratio of about 70:30 to 75:25, and more preferably in a ratio of about 75:25.

Dicyclohexylmethane 4,4'-diisocyanate may likewise be in the form of a mixture of the different cis and trans isomers.

Cycloaliphatic isocyanates are those which comprise at least one cycloaliphatic ring system.

Aliphatic isocyanates are those which comprise exclusively linear or branched chains, in other words acyclic compounds.

For the present invention it is possible to use not only those di- and polyisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, optionally, of N-unsubstituted carbamic esters, dialkyl carbonates, and other by-products recycled from the reaction process. Di- or polyisocyanates obtained in this way generally contain a very low or even unmeasurable fraction of chlorinated compounds, leading to favorable color numbers in the products.

In one embodiment of the present invention the di- and polyisocyanates (A) have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Of course, though, di- and polyisocyanates (A) having a higher chlorine content can also be used.

Further noteworthy are

1) Polyisocyanates containing isocyanurate groups and derived from aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, tris-isocyanatoalkyl and/or tris-isocyanatocycloalkyl isocyanurates, which constitute cyclic trimers of the diisocyanates, or are mixtures with their higher homologs containing more than one isocyanurate ring. The isocyanatoisocyanurates generally have an NCO content of 10% to 30% by weight, in particular 15% to 25% by weight, and an average NCO functionality of 2.6 to 8.

2) Uretdione diisocyanates with aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates. The uretdione diisocyanates can be used as a sole component or in a mixture with other polyisocyanates, particularly those specified under 1).

3) Polyisocyanates containing biuret groups and having cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18% to 22% by weight and an average NCO functionality of 2.8 to 4.5.

4) Polyisocyanates containing urethane and/or allophanate groups and having aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with mono- or polyhydric alcohols such as, for example, methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol, trimethylolpropane, neopentyl glycol, pentaerythritol, 1,4-butanediol, 1,6-hexanediol, 1,3-propanediol, 2-ethyl-1,3-propanediol, 2-methyl-1,3-propanediol, ethylene glycol, diethylene glycol, triethylene glycol, tetraethylene glycol, pentaethylene glycol, glycerol, 1,2-dihydroxypropane, 2,2-dimethyl-1,2-ethanediol, 1,2-butanediol, 1,4-butanediol, 3-methylpentane-1,5-diol, 2-ethylhexane-1,3-diol, 2,4-diethyloctane-1,3-diol, hydroxypivalic acid neopentyl glycol ester, ditrimethylolpropane, dipentaerythritol, 2,2-bis(4-hydroxycyclohexyl)propane, 1,1-, 1,2-, 1,3-, and 1,4-cyclohexanedimethanol, 1,2-, 1,3- or 1,4-cyclohexanediol or mixtures thereof. These polyisocyanates containing urethane and/or allophanate groups generally have an NCO content of 12% to 20% by weight and an average NCO functionality of 2.5 to 4.5.

5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.

6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Uretonimine-modified polyisocyanates.
8) Carbodiimide-modified polyisocyanates.
9) Hyperbranched polyisocyanates, of the kind known for example from DE-A1 10013186 or DE-A1 10013187.
10) Polyurethane-polyisocyanate prepolymers, from di- and/or polyisocyanates with alcohols.
11) Polyurea-polyisocyanate prepolymers.

Polyisocyanates 1) to 11) may be used in a mixture, including optionally in a mixture with diisocyanates.

The polyisocyanates (A) may also be present at least partly in blocked form.

Groups of this kind for the blocking of isocyanates are described in D. A. Wicks, Z. W. Wicks, Progress in Organic Coatings, 36, 148-172 (1999), 41, 1-83 (2001) and also 43, 131-140 (2001).

This is especially preferred when the coating compositions of the invention are to be used in one-component form.

Preferred compounds (A) are the urethanes, biurets, and isocyanurates, more preferably the isocyanurates, of hexamethylene 1,6-diisocyanate (HDI) or 1-isocyanato-3-isocyanato-methyl-3,5,5-trimethylcyclohexane, very preferably of hexamethylene 1,6-diisocyanate.

As an inevitable result of their preparation, polyisocyanates (A) may still have a small fraction of the parent monomeric diisocyanate—for example, up to 5% by weight, more preferably up to 3% by weight, very preferably up to 2%, more particularly up to 1%, especially up to 0.5%, and even up to 0.25% by weight.

The polyol (B) is at least one polyol which has
a hydroxyl group functionality of at least 2 and up to 4 and
a number-average molar weight of at least 92 to 1500 g/mol.

The functionality ought to be at least 2, preferably at least 2 and up to 4. Preferred more particularly is a functionality which on average is from 2 to 3.

The polyols having the above-stated functionality may preferably be:
(B1) esterification products of at least one fatty acid with at least one polyalcohol and/or
(B2) esterification products of at least one hydroxyalkane carboxylic acid or the corresponding lactone with at least one polyalcohol and/or
(B3) at least one optionally alkoxylated polyalcohol.

The compounds (B1) are esterification products of at least one fatty acid with at least one polyalcohol.

Use is made of at least one fatty acid, as for example one to five, preferably one to three, more preferably one to two, and very preferably exactly one fatty acid.

In a preferred embodiment of the present invention, natural fatty acids in particular are used in the form of their mixtures.

The fatty acid has at least 12 carbon atoms, preferably at least 14, and more preferably at least 16.

In general the fatty acids have up to 40 carbon atoms, preferably up to 30, and more preferably up to 20.

The fatty acids are in general alkane-, alkene-, alkadiene- or alkapolyene-carboxylic acids, which may carry one or more hydroxyl groups and which may be straight-chain or branched, preferably straight-chain; preferably alkane- or alkene carboxylic acids, more preferably alkane carboxylic acids, which may carry one or more hydroxyl groups.

Examples of such are lauric acid, myristic acid, pentadecanoic acid, palmitic acid, margaric acid, stearic acid, nonadecanoic acid, arachidic acid, behenic acid, lignoceric acid, hexacosanoic acid, octacosanoic acid, triacontanoic acid, dotricosanoic acid, tritricosanoic acid, tetratricosanoic acid, pentatricosanoic acid, oleic acid, linoleic acid, and linolenic acid.

Of this at least one fatty acid, at least one fatty acid carries at least one hydroxyl group, as for example one to three, preferably one or two, and more preferably precisely one hydroxyl group.

One preferred example of a fatty acid which carries hydroxyl groups is ricinoleic acid (12-hydroxy-(Z)-octadec-9-enoic acid) and isoricinoleic acid (9-hydroxy-(Z)-12-octadecenoic acid), it being immaterial for the purposes of the invention in which enantiomeric form is used, preferably the (R)-form, or whether it is used in an enantiomerically pure form, as an enantiomer-enriched mixture, or as an enantiomer mixture. Another preferred example is 12-hydroxystearic acid.

The polyalcohol is at least one, preferably precisely one, at least difunctional polyol, preferably having two to four, more preferably having two to three, hydroxyl groups.

Examples thereof are trimethylolbutane, trimethylolpropane, trimethylolethane, pentaerythritol, glycerol, ditrimethylolpropane, and diglycerol.

In one preferred embodiment the compound (B1) is castor oil having an OH number of 160 to 173 mg KOH/g.

This castor oil for the purposes of the present specification is an at least partly and preferably wholly esterified acyl glycerol wherein at least one, preferably at least two, of the acyl groups are ricinoleic acid or isoricinoleic acid, preferably ricinoleic acid.

For example, the mixture of fatty acids preferably comprises a mixture of two molecules of ricinoleic acid with a fatty acid which carries no hydroxyl group, preferably selected from the group consisting of oleic acid, linoleic acid, palmitic acid, and stearic acid.

The compounds (B2) are esterification products of at least one hydroxylalkane carboxylic acid or of the corresponding lactone with at least one polyalcohol.

The polyalcohol is at least one, preferably precisely one, at least difunctional polyol, preferably having two to four, more preferably two to three, hydroxyl groups.

Examples thereof are ethylene glycol, diethylene glycol, triethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, 2,2-bis(4-hydroxycyclohexyl)propane, 1,1-, 1,2-, 1,3-, and 1,4-cyclohexanedimethanol, 1,2-, 1,3-, or 1,4-cyclo-hexanediol, trimethylolbutane, trimethylolpropane, trimethylolethane, pentaerythritol, glycerol, ditrimethylolpropane, and diglycerol.

Lactone-based polyesterols are preferred, these being homopolymers or copolymers of lactones, preferably adducts, with terminal hydroxyl groups, of lactones with suitable starter molecules of corresponding functionality.

Lactones contemplated are preferably those deriving from compounds of the general formula HO—$(CH_2)_z$—COOH, where z is a number from 1 to 20 and where one H atom of a methylene unit may also be substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid, or pivalolactone, and also mixtures thereof. Examples of suitable starter components are the abovementioned polyols. The corresponding polymers of ε-caprolactone are particularly preferred.

Particularly preferred as compounds (B2) are the following compounds:

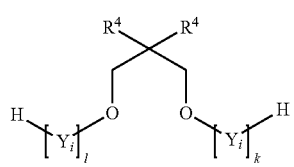

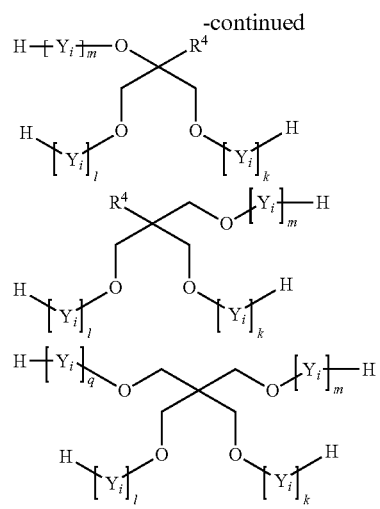

in which $R^4$ is hydrogen or a $C_1$ to $C_4$ alkyl radical, k, l, m, and q in each case independently of one another are a positive integer from 1 to 5, preferably 1 to 4, and especially 2 to 3, $Y_i$ for each i, in each case independently of one another, is a radical —[—O—$(CH_2)_z$—(C=O)—]—, and z is a positive integer from 2 to 6, preferably 2 to 5, more preferably 3 to 5.

The component (B3) comprises at least one, preferably one to four, more preferably one to three, very preferably one or two, and more particularly precisely one optionally alkoxylated polyalcohol.

The polyalcohol is at least one, preferably precisely one, at least difunctional polyol, preferably having two to four, more preferably having three or four, and very preferably having three hydroxyl groups.

Preferred compounds (B3) are those of the formula

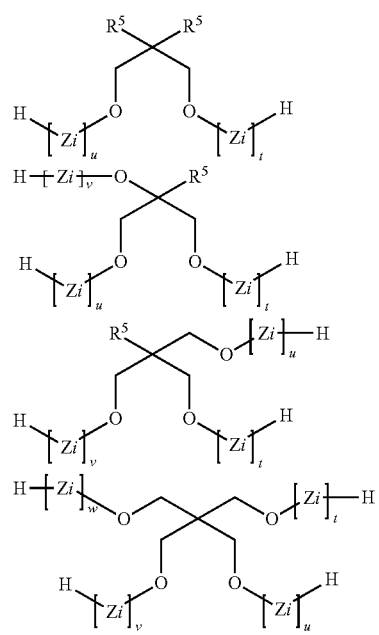

in which

R⁵ is hydrogen or a $C_1$ to $C_4$ alkyl radical, t, u, v, and w in each case independently of one another are 0 or a positive integer from 1 to 6, preferably to 4, and more preferably to 3, each $Z_i$ for i=1 to t, 1 to u, 1 to v, and 1 to w, independently of one another, may be selected from the group —CH₂—CH₂—O—, —CH₂—CH(CH₃)—O—, —CH(CH₃)—CH₂—O—, —CH₂—C(CH₃)₂—O—, —C(CH₃)₂—CH₂—O—, —CH₂—CHVin—O—, —CHVin—CH₂—O—, —CH₂—CHPh—O—, and —CHPh—CH₂—O—, preferably from the group —CH₂—CH₂—O—, —CH₂—CH(CH₃)—O—, and —CH(CH₃)—CH₂—O—, and more preferably —CH₂—CH₂—O—.

Diols contemplated include ethylene glycol, diethylene glycol, triethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-3-hexanediol, 2,4-diethyloctane-1,3-diol, 2,2-bis(4-hydroxycyclohexyl)propane, 1,1-, 1,2-, 1,3 and 1,4-cyclohexanedimethanol, 1,2-, 1,3- or 1,4-cyclohexanediol, preferably 1,2-propanediol, ethylene glycol, 2,2-dimethyl-1,2-ethanediol, 1,3-propanediol, 1,2-butanediol, 1,4-butanediol, 3-methylpentane-1,5-diol, 2-ethylhexane-1,3-diol, 2,4-diethyloctane-1,3-diol, and 1,6-hexanediol.

Triols contemplated include trimethylolbutane, trimethylolpropane, trimethylolethane, and glycerol.

Examples of compounds (B3) are trimethylolbutane, trimethylolpropane, trimethylolethane, pentaerythritol, glycerol, ditrimethylolpropane, and diglycerol, and also their products ethoxylated and/or propoxylated, preferably ethoxylated, one to six times, preferably one to four times, and more preferably one to three times, per hydroxyl group; preferred are glycerol, trimethylol propane, pentaerythritol, glycerol with up to 18 times ethoxylation, glycerol with up to 18 times propoxylation, trimethylolpropane with up to 18 times ethoxylation, and trimethylolpropane with up to 18 times mixed ethoxylation and propoxylation; particularly preferred are glycerol, trimethylolpropane, and trimethylolpropane with up to 18 times ethoxylation.

Component (C) comprises a monoalcohol having at least 7, preferably at least 10, ethylene oxide groups.

Generally speaking, component (C) comprises not more than 30 ethylene oxide groups, preferably not more than 25, and more preferably not more than 20 ethylene oxide groups.

Ethylene oxide groups in this context are groups —CH₂—CH₂—O which are installed in repetition in component (C).

Suitable monools whose ethoxylated products can be used as components (C) include methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, cyclopentanol, cyclohexanol, cyclooctanol, and cyclododecanol. The aforementioned $C_1$ to $C_4$ alkanols are preferred, and methanol is particularly preferred.

Particularly preferred compounds (C) are polyalkylene oxide polyether alcohols obtainable by alkoxylating monohydroxy compounds of the general formula

R¹—O—H or secondary monoamines of the general formula

R²R³N—H, in which

R¹, R², and R³ independently of one another are each $C_1$-$C_{16}$ alkyl, $C_2$-$C_{18}$ alkyl uninterrupted or interrupted by one or more oxygen and/or sulfur atoms and/or by one or more substituted or unsubstituted imino groups, or are $C_6$-$C_{12}$ aryl, $C_5$-$C_{12}$ cycloalkyl or a five- or six-membered heterocycle containing oxygen, nitrogen and/or sulfur atoms, or R² and R³ together form an unsaturated, saturated or aromatic ring whose members are uninterrupted or interrupted by one or more oxygen and/or sulfur atoms and/or by one or more substituted or unsubstituted imino groups, it being possible for the radicals mentioned each to be substituted by functional groups, aryl, alkyl, aryloxy, alkyloxy, halogen, heteroatoms and/or heterocycles.

Preferably R¹ is $C_1$ to $C_4$ alkyl, i.e., methyl, ethyl, isopropyl, n-propyl, n-butyl, iso-butyl, sec-butyl or tert-butyl; very preferably R¹ is methyl.

Examples of suitable monofunctional starter molecules may be saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxymethyloxetane, or tetrahydrofurfuryl alcohol; unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis(2-ethylhexyl)amine, N-methyl- and N-ethylcyclohexylamine or dicyclohexylamine, heterocyclic secondary amines such as morpholine, pyrrolidine, piperidine or 1H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Preferred compounds (C) are polyether alcohols based on polyalkylene oxide polyether alcohols prepared using saturated aliphatic or cycloaliphatic alcohols of the abovementioned type as initiator molecules. Very particular preference is given to those based on polyalkylene oxide polyether alcohols prepared using saturated aliphatic alcohols having 1 to 4 carbon atoms in the alkyl radical. Polyalkylene oxide polyether alcohols prepared starting from methanol are especially preferred.

The monohydric polyalkylene oxide polyether alcohols contain on average generally from 7 to 30, preferably from 7 to 25, more preferably from 7 to 2-, 10 to 20 ethylene oxide units per molecule.

Preferred polyether alcohols (C) are, therefore, compounds of the formula

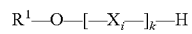

R¹—O—[—X$_i$—]$_k$—H where

R¹ is as defined above, k is an integer from 5 to 30, preferably 7 to 25, more preferably 7 to 20, and in particular 10 to 20, and each $X_i$ for i=1 to k is —CH₂—CH₂—O—.

The polyether alcohols may further comprise, as hydrophilic synthesis components, minor amounts of other isocyanate-reactive compounds with anionic or cationic groups—for example, with carboxylate, sulfonate or ammonium groups. This, however, is less preferred.

For preparing the water-emulsifiable polyisocyanates, at least part, and preferably the whole amount, of starting components (A) and (B) and also (C), is reacted at temperatures of 40 to 180° C., preferably 50 to 150° C., observing an NCO/OH equivalents ratio of at least 5:1, preferably at least 7:1, and more preferably at least 10:1, and an NCO/OH equivalents ratio of up to 100:1, preferably up to 50:1, more preferably up to 30:1, very preferably up to 25:1, and more particularly up to 18:1, with at least part, preferably the total amount, of the compound (B) and/or (C).

It is also possible, although less preferable, first to react starting component (A) at least partly with (B) and only subsequently with (C), or, conversely, first to react starting component (A) at least partly with (C) and only subsequently with (B). Preference, however, is given to the simultaneous reaction of (A), (B), and (C).

The reaction mixture is reacted with component (C) in an amount such that the end product has an ethylene oxide group content, calculated as 44 g/mol, based on the sum total of components (A), (B), and (C), of at least 12% by weight, preferably at least 14% and more preferably at least 15% by weight. The ethylene oxide group content generally does not exceed 25% by weight, preferably not more than 23%, more preferably not more than 20% by weight.

The reaction time is generally 10 min to 5 hours, preferably 15 min to 4 hours, more preferably 20 to 180 min, and very preferably 30 to 120 min.

In order to accelerate the reaction it is possible optionally to use suitable catalysts.

These are the customary catalysts which are known for these purposes, examples being metal carboxylates, metal chelates or tertiary amines of the type described in GB-A-0 994 890, alkylating agents of the type described in U.S. Pat. No. 3,769,318, or strong acids as described by way of example in EP-A-0 000 194.

Suitable catalysts are, in particular, zinc compounds, such as zinc(II) stearate, zinc(II) n-octanoate, zinc(II) 2-ethyl-1-hexanoate, zinc(II) naphthenate or zinc(II) acetylacetonate, tin compounds, such as tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate or dioctyltin diacetate, aluminum tri(ethyl acetoacetate), iron(III) chloride, potassium octoate, manganese compounds, cobalt compounds, bismuth compounds, Zn(II) compounds, Zr(IV) compounds or nickel compounds, and strong acids, such as trifluoroacetic acid, sulfuric acid, hydrogen chloride, hydrogen bromide, phosphoric acid or perchloric acid, for example, or any desired mixtures of these catalysts.

Suitable though less preferred catalysts for the process are also those catalysts as described for example in EP-A-0 649 866 on page 4 line 7 to page 5 line 15.

Preferred catalysts for the process of the invention are zinc compounds of the abovementioned type. Very particular preference is given to using zinc(II) n-octanoate, zinc(II) 2-ethyl-1-hexanoate and/or zinc(II) stearate.

If at all, these catalysts are employed in an amount of 0.001% to 5% by weight, preferably 0.005% to 1% by weight, based on the overall weight of the reactants.

The polyaddition reaction for preparing the polyurethane formulation may take place with particular preference in the presence of cesium salts, as described in DE 10161156. Preferred cesium salts are compounds in which the following anions are employed: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$, and $(C_{n+1}H_{2n-2}O_4)^{2-}$, n standing for the numbers 1 to 20.

Particularly preferred compounds are cesium carboxylates in which the anion is of the formula $(C_nH_{2n-1}O_2)^-$ or $(C_{n+1}H_{2n-2}O_4)^{2-}$ where n is 1 to 20. Especially preferred cesium salts contain monocarboxylate anions of the general formula $(C_nH_{2n-1}O_2)^-$ where n stands for the numbers 1 to 20. Particular mention may be made here of formate, acetate, propionate, hexanoate, and 2-ethylhexanoate.

The cesium salts are used in amounts of 0.01 to 10 mmol of cesium salt per kg of solvent-free reaction mixture. They are preferably used in amounts of 0.05 to 2 mmol of cesium salt per kg of solvent-free reaction mixture.

The cesium salts can be added to the reaction mixture in solid form, but preferably in dissolved form. Suitable solvents are polar, aprotic solvents or else protic solvents. Particularly suitable besides water are alcohols; especially suitable are polyols, such as are also used as synthesis units for polyurethanes, such as ethane-, propane-, and butane-diols, for example. The use of the cesium salts makes it possible to carry out the polyaddition reaction under the customary conditions.

Addition to the reaction mixture may take place by any desired method for optional use. Thus, for example, it is possible to admix the catalyst either to the polyisocyanate component (A), (B) and/or to the component (C) before the beginning of the actual reaction. It is also possible to add the catalyst to the reaction mixture at any time during the reaction or else, in a two-stage reaction regime, following the urethanization, i.e., when the NCO content corresponding theoretically to complete conversion of isocyanate and hydroxyl groups has been reached.

In one preferred embodiment of the present invention, components (B) and (C) are bonded predominantly by urethane groups, whereas the bonding by allophanate groups is to make up the smaller part.

Relative to the hydroxyl groups reacted with an isocyanate in components (B) and (C), preferably more than 50 mol % are bonded via urethane groups, more preferably at least 60 mol %, very preferably at least 66 mol %, more particularly at least 75 mol %, especially at least 80 mol %, and even at least 90 mol %.

The reaction conditions are preferably selected, accordingly, so that less than 10 mol % of the hydroxyl groups in components (B) and (C) are bonded via allophanate groups in the product. This can be achieved for example by avoiding reaction conditions of the kind described in EP 959087 A1 for achieving a high allophanate content.

This can preferably be achieved by selecting, among the stated catalysts, those which form allophanate groups only to a small degree.

In particular, the formation of allophanate groups can be kept low by holding the reaction temperature, in the presence of a catalyst, at not more than 90° C., preferably not more than 85° C., and more preferably at not more than 80° C.

The course of the reaction can be monitored by determining the NCO content by means, for example, of titrimetry. When the target NCO content has been reached the reaction is terminated. In the case of a purely thermal reaction regime, this can be done, for example, by cooling the reaction mixture to room temperature. Where a catalyst of the aforementioned type is used, however, the reaction is generally stopped by adding suitable deactivators. Examples of suitable deactivators include organic or inorganic acids, the corresponding acid halides, and alkylating agents. Examples that may be mentioned include phosphoric acid, monochloroacetic acid, dodecylbenzenesulfonic acid, benzoyl chloride, dimethyl sulfate, and, preferably, dibutyl phosphate and also di-2-ethylhexyl phosphate. The deactivators can be used in amounts of 1 to 200 mol %, preferably 20 to 100 mol %, based on the number of moles of catalyst.

The resultant polyisocyanate mixtures generally have an NCO content of preferably 14.0 to 20.0% by weight, more preferably 15.0 to 19.0% by weight.

The resulting polyisocyanate mixtures generally have a viscosity at 23° C. of 3 to 12 Pas, more preferably 3.5 to 8 Pas.

In this specification the viscosity is reported, unless indicated otherwise, at 23° C. in accordance with DIN EN ISO 3219/A.3 in a cone/plate system with a shear rate of 1000 s$^{-1}$.

The process may be carried out optionally in a suitable solvent (D) which is inert toward isocyanate groups. Examples of suitable solvents are the conventional paint solvents known per se, such as ethyl acetate, butyl acetate, ethylene glycol monomethyl or monoethyl ether acetate, 1-methoxy-2-propyl acetate, 3-methoxy-n-butyl acetate, acetone, 2-butanone, iso-butyl methyl ketone, 4-methyl-2-pentanone, cyclohexanone, cyclopentanone, toluene, xylene, chlorobenzene, white spirit, aromatics with relatively high degrees of substitution, such as are sold, for example, under the names Solventnaphtha®, Solvesso®, Shellsol®, Isopar®, Nappar® and Diasol®, propylene glycol diacetate, diethylene glycol dimethyl ether, dipropylene glycol dimethyl ether, diethylene glycol ethyl and butyl ether acetate, N-methylpyrrolidone, and N-methylcaprolactam, and also, preferably, carbonic esters or lactones, which are specified in EP-A1 697 424, page 4 lines 4 to 32, more preferably dimethyl carbonate, diethyl carbonate, 1,2-ethylene carbonate and 1,2-propylene carbonate, lactones such as β-propiolactone, γ-butyrolactone, ε-caprolactone, and ε-methylcaprolactone, or else any desired mixtures of such solvents.

It is also possible first to prepare the isocyanates without solvent and then to use a solvent (D) to take up the product thus obtainable.

Based on the total mixture (sum of components (A), (B), and (C)), the solvent (D) may be present in amounts of 0 to 60% by weight, preferably in amounts of 0 to 50% by weight.

The mixtures may be dispersed preferably in water for the purpose of preparing aqueous dispersions; with particular preference, the mixtures are mixed into aqueous dispersions.

The polyisocyanate formulation is suitable for modifying aqueous coating materials (paints, protective coatings)—for example—such as wood, wood veneer, paper, paperboard, cardboard, textile, leather, nonwoven, plastics surfaces, glass, ceramic, mineral building materials such as cement moldings and fiber cement slabs, metals, or coated metals, adhesive or impregnating compositions, for coloring, for example, based on aqueous dispersions or solutions with a solids content of 5% to 40% by weight, preferably from 5% to 20% by weight. Suitable coating materials include the aqueous dispersions, known per se, of homopolymers and copolymers of olefinically unsaturated monomers or polyurethanes or else solutions of natural substances, such as of casein, for example.

The polyisocyanate formulations are added to the aqueous coating materials generally in an amount of 1% to 25%, preferably from 2.5% to 20% by weight, based on the solids content of the coating material.

The polyisocyanate formations may be used in one-component coating compositions, in the form of polyurethane dispersions, for example, or as a mixture with a hydroxyl-containing binder, as a two-component polyurethane coating composition.

They are applied to the substrate in a known manner by means, for example, of spraying at a rate of 5 to 50 g solids/m$^2$.

Suitable dispersions of homopolymers or copolymers of olefinically unsaturated monomers are, for example, conventional dispersions of homopolymers or copolymers based on vinyl esters of carboxylic acids having 2 to 18, preferably 2 to 4, carbon atoms such as vinyl acetate in particular, if desired with up to 70% by weight, based on the total amount of olefinically unsaturated monomers, of other olefinically unsaturated monomers, and/or of homopolymers or copolymers of (meth)acrylic esters of alcohols having 1 to 18, preferably 1 to 4, carbon atoms, such as methyl, ethyl, propyl, hydroxyethyl or hydroxypropyl (meth)acrylates in particular, together if desired with up to 70% by weight of other olefinically unsaturated monomers, and/or butadiene-styrene copolymers having a butadiene content of about 20% to 60% by weight, and/or of other diene polymers or copolymers such as polybutadiene or copolymers of butadiene with other olefinically unsaturated monomers such as styrene, acrylonitrile and/or methacrylonitrile, for example, and/or aqueous dispersions of polymers or copolymers of 2-chloro-1,3-butadiene, if desired with other olefinically unsaturated monomers of the type exemplified above, e.g., those with a chlorine content of about 30% to 40% by weight, in particular a chlorine content of about 36% by weight.

Preference is given to aqueous dispersions of copolymers of 90% to 99.5% by weight of acrylates or methacrylates of alkanols comprising 1 to 4 carbon atoms and 0.5% to 10% by weight, based in each case on the copolymer, of hydroxyalkyl acrylates and methacrylates having 2 to 20 carbon atoms in the hydroxyalkyl radical, such as hydroxyethyl, hydroxypropyl or hydroxybutyl acrylate or methacrylate. Such dispersions are known per se and can be prepared conventionally by emulsion polymerization (see Houben-Weyl, Methoden der organischen Chemie, 4th edition, vol. E 20, p. 217 ff.).

Suitable aqueous polyurethane dispersions are those of the type known per se, as described in, for example, U.S. Pat. No. 3,479,310, GB-A 1,076,688, U.S. Pat. No. 4,108,814, U.S. Pat. No. 4,092,286, DE-A 2 651 505, U.S. Pat. No. 4,190,566, DE-A 2 732 131 or DE-A 2 811 148.

The aqueous dispersions used may comprise the customary auxiliaries and additives. These include, for example, fillers, such as quartz powder, quartz sand, highly disperse silica, heavy spar, calcium carbonate, chalk, dolomite or talc, which are often used together with suitable wetting agents such as polyphosphates, for example, such as sodium hexametaphosphate, naphthalenesulfonic acid, ammonium or sodium salts of polyacrylic acids, the wetting agents being added generally in amounts of 0.2% to 0.6% by weight, based on filler.

Further suitable auxiliaries are organic thickeners to be used in amounts, for example, of 0.01% to 1% by weight, based on the dispersion, such as cellulose derivatives, alginates, starch or starch derivatives or polyacrylic acid, or inorganic thickeners to be used in amounts of 0.05% to 5% by weight, based on the dispersion, such as bentonites, for example.

Fungicides for preservation may also be added to the dispersions. These are employed generally in amounts of 0.02% to 1% by weight, based on the dispersion. Examples of suitable fungicides are phenol and cresol derivatives and also organotin compounds.

Substrates for impregnation are, for example, synthetic or nonsynthetic fibers and/or nonwovens or woven fabrics comprising such fibers.

The mixtures can be dispersed very finely in aqueous dispersions. The resulting dispersions are very stable on storage. Moreover, less of the water-emulsifiable polyisocyanate need be added in order to set the desired properties of the dispersion or to achieve the desired properties during application.

The mixtures can of course be provided with customary auxiliaries and additives of coatings technology. These include, for example, defoamers, thickeners, leveling assistants, pigments, emulsifiers, dispersing assistants, and also solvents. The desired processing viscosity is set by adding water.

To prepare the dispersions it is sufficient in the majority of cases to use simple emulsifying techniques, for example, with a mechanical stirrer, or else in many cases simple mixing of the two components by hand, in order to obtain dispersions having very good properties. Naturally it is also possible, however, to employ mixing techniques involving a relatively high shearing energy, such as jet dispersion, for example.

The coating materials comprising the mixtures may be used in particular as primers, surfacers, pigmented topcoat materials, and clearcoat materials in the sector of automotive refinish or the painting of large-size vehicles. The coating materials are particularly suitable for applications where particularly high application reliability, outdoor weathering stability, optical properties, solvent resistance, chemical resistance, and water resistance are required, such as in automotive refinishing and the painting of large-size vehicles.

The coating materials comprising the mixtures may be applied by any of a wide variety of spraying methods, such as, for example, air-pressure, airless or electrostatic spraying methods using one-component or two-component spraying units, or else by spraying, troweling, knife coating, brushing, rolling, roller coating, flow coating, laminating, in-mold coating or coextrusion.

The coatings are generally dried and cured under normal temperature conditions, i.e., without heating the coating. Alternatively, the mixtures may be used to produce coatings which following application are dried and cured at elevated temperature, e.g., at 40-250° C., preferably 40-150° C., and especially 40 to 100° C.

The examples which follow are intended to illustrate the properties of the invention but without restricting it.

EXAMPLES

In this specification, unless indicated otherwise, parts are to be understood as meaning parts by weight.

Polyisocyanate A:

HDI isocyanurate having an NCO content of 22.2% and a viscosity of 2800 mPa*s at 23° C. (available commercially as Basonat® HI 100 from BASF SE, Ludwigshafen).

Polyether A:

Monofunctional polyethylene oxide, prepared starting from methanol and with potassium hydroxide catalysis, having an OH number of 112 (according to DIN 53240) and a molecular weight of 500 g/mol. The basic catalyst residues still present were subsequently neutralized with acetic acid and the product was desalted. The same procedure also removes potassium acetate that has formed.

Polyether B:

Difunctional polyethylene oxide, prepared with potassium hydroxide catalysis, having an OH number of 560 (according to DIN 53240) and a molecular weight of 200 g/mol. The basic catalyst residues still present were subsequently neutralized with acetic acid.

Polyether C:

Trifunctional polyethylene oxide, prepared starting from trimethylolpropane and with potassium hydroxide catalysis, having an OH number of 600 mg KOH/g (according to DIN 53240) and a molecular weight of 280 g/mol. The basic catalyst residues still present were subsequently neutralized with acetic acid.

Polyesterol A:

Trifunctional polycaprolactone, prepared starting from trimethylolpropane, having an OH number of 310 (according to DIN 53240) and a molecular weight of 540 g/mol.

Polyol A:

Castor oil (OH number 164 mg KOH/g)

Comparative Example 1

174 g of polyisocyanate A and 26 g of polyether A were reacted at 85° C. for 4 hours. The corresponding product has an NCO content of 17.9%, and a viscosity of 2550 mPas at 23° C., and would be only partly water-dispersible.

Inventive Example 1

250 g of polyisocyanate A, 35 g of polyether A, and 5 g of polyol A were reacted with addition of 0.06 g of zinc neodecanoate (50% strength in butyl acetate) as catalyst. After 2 hours at 85° C., the NCO content was 17.6%. The corresponding product has a viscosity of 3900 mPas at 23° C. and a color number of 33 Hazen.

Inventive Example 2

250 g of polyisocyanate A, 45 g of polyether A, and 6 g of polyesterol A were reacted without addition of catalyst. After 3 hours at 90° C., the NCO content was 16.7%. The corresponding product has a viscosity of 4080 mPas at 23° C. and a color number of 43 Hazen.

Inventive Example 3

250 g of polyisocyanate A, 40 g of polyether A, 2 g of polyether B and 5 g of polyol A were reacted with addition of 0.06 g of dibutyltin dilaurate as catalyst. After 3 hours at 90° C., the NCO content was 16.8%. The corresponding product has a viscosity of 4680 mPas at 23° C. and a color number of 76 Hazen.

Inventive Example 4

250 g of polyisocyanate A, 44 g of polyether A, and 1.5 g of polyether C were reacted with addition of 0.03 g of dibutyltin dilaurate as catalyst. After 3 hours at 90° C., the NCO content was 17.1%. The corresponding product has a viscosity of 3530 mPas at 23° C. and a color number of 42 Hazen.

Gloss Measurements:

Component A:

Blumor Intensiv Component from Blanchon.

The 100% polyisocyanate was diluted to 70% with dipropylene glycol dimethyl ether. Then 5 g of this quantity of curing agent were added to 45 g of component A. The formulation was then stirred by hand with a wooden spatula at 140-180 rpm for approximately 20 seconds. Without being filtered, the completed varnish was then applied to a cardboard panel, using a 150 μm four-way bar applicator. After drying (at 60° C. for 30 minutes), a measurement was made of the gloss from two different angles (20° and 60°), using a micro TRI Gloss μ apparatus from Byk.

| Gloss | Comp. example | Inv. Example 1 | Inv. Example 2 | Inv. Example 3 | Inv. Example 4 |
|---|---|---|---|---|---|
| 20° | 2.3 | 11 | 10.5 | 8.6 | 8.3 |
| 60° | 17.8 | 44.5 | 42.5 | 39.2 | 38.3 |

The invention claimed is:

1. A water-emulsifiable polyisocyanate, comprising
   (A) a polyisocyanate derived from at least one (cyclo) aliphatic diisocyanate,
   (B) a polyol having
      a functionality of hydroxyl groups of at least 2 and up to 4 and
      a number-average molar weight of at least 92 to 1500 g/mol,
   (C) a monoalcohol comprising at least 7 ethylene oxide groups, and
   (D) optionally a solvent,
   wherein:
   a ratio of NCO groups in (A) to hydroxyl groups in (B) and (C) is from 5:1 to 100:1,
   an amount of ethylene oxide groups, calculated as 44 g/mol, based on a sum total of (A), (B) and (C), is at least 12% by weight,
   an amount of component (B) is from 0.5 to 4.0% by weight, based on the sum total of (A), (B) and (C),
   an amount of component (C) is at least 5% and up to 25% by weight, based on the sum total of (A), (B) and (C), and
   the water-emulsifiable polyisocyanate has a viscosity at 23° C. in accordance with DIN EN ISO 3219/A.3 in a cone/plate system with a shear rate of 1000 s$^{-1}$ of from 2500 mPas to 12,000 mPas.

2. The water-emulsifiable polyisocyanate according to claim 1, wherein the (cyclo)aliphatic diisocyanate is selected from the group consisting of hexamethylene diisocyanate, 1,3-bis(isocyanatomethyl)cyclohexane, isophorone diisocyanate, 4,4'-di(isocyanatocyclohexyl)methane, and 2,4'-di(isocyanatocyclohexyl)methane.

3. The water-emulsifiable polyisocyanate according to claim 1, wherein the polyisocyanate is an isocyanurate of hexamethylene 1,6-diisocyanate.

4. The water-emulsifiable polyisocyanate according to claim 1, wherein the polyol (B) comprises
   (B1) esterification product of at least one fatty acid with at least one polyalcohol and/or
   (B2) esterification product of at least one hydroxyalkane carboxylic acid or a lactone thereof with at least one polyalcohol and/or
   (B3) an optionally alkoxylated polyalcohol.

5. The water-emulsifiable polyisocyanate according to claim 4, wherein compound (B1) is castor oil having an OH number of from 160 to 173 mg KOH/g.

6. The water-emulsifiable polyisocyanate according to claim 4, wherein compound (B2) is at least one compound selected from the group consisting of:

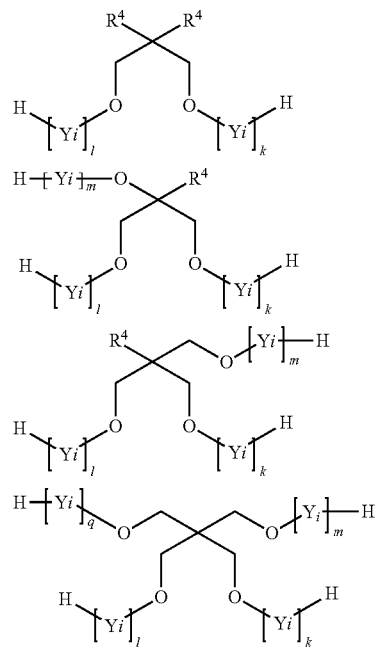

where $R^4$ is hydrogen or a C1 to C4 alkyl radical, k, l, m, and q in each case are independently a positive integer of from 1 to 5, Yi in each case is independently a radical —[—O—(CH$_2$)$_z$—(C=O)—]—, and z is a positive integer of from 2 to 6.

7. The water-emulsifiable polyisocyanate according to claim 4, wherein compound (B3) is at least one compound selected from the group consisting of:

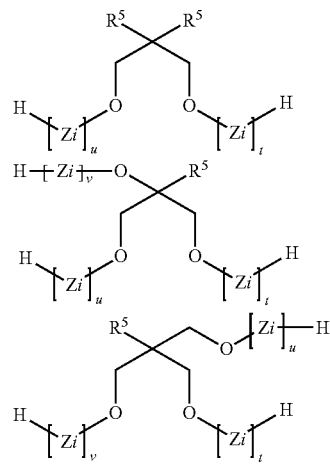

-continued

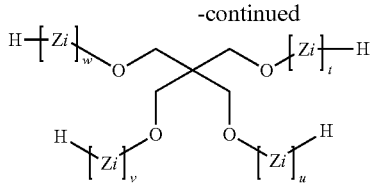

where
$R^5$ is hydrogen or a $C_1$ to $C_4$ alkyl radical,
t, u, v, and w in each case are independently 0 or a positive integer of from 1 to 6, and
each $Z_i$ is independently selected from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O—, and —CHPh-$CH_2$—O—.

8. The water-emulsifiable polyisocyanate according to claim 1, wherein the monoalcohol (C) is a compound of formula

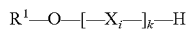

where
$R^1$ is $C_1$-$C_{18}$ alkyl, $C_2$-$C_{18}$ alkyl optionally interrupted by one or more oxygen and/or sulfur atoms and/or by one or more substituted or unsubstituted imino groups, or is $C_6$-$C_{12}$ aryl, $C_5$-$C_{12}$ cycloalkyl, or a five- to six-membered heterocycle comprising oxygen, nitrogen and/or sulfur atoms,
k is an integer of from 7 to 35, and
each $X_i$ is independently —$CH_2$—$CH_2$—O—.

9. A coating material, comprising:
the water-emulsifiable polyisocyanate according to claim 1.

10. A coated article, comprising:
a substrate; and
the coating material according to claim 9 on the substrate,
wherein the substrate is selected from the group consisting of wood, wood veneer, paper, paperboard, cardboard, textile, leather, nonwoven substrate, plastics surface, glass, ceramic, mineral building material, metal, and coated metal.

* * * * *